(12) United States Patent
Motoki et al.

(10) Patent No.: US 10,139,008 B2
(45) Date of Patent: Nov. 27, 2018

(54) SOLENOID SPOOL VALVE

(71) Applicant: DENSO CORPORATION, Kariya, Aichi-pref. (JP)

(72) Inventors: Atsushi Motoki, Kariya (JP); Akira Takagi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/386,319

(22) Filed: Dec. 21, 2016

(65) Prior Publication Data

US 2017/0184213 A1    Jun. 29, 2017

(30) Foreign Application Priority Data

Dec. 24, 2015   (JP) .................. 2015-251288

(51) Int. Cl.
  *F16K 31/06*   (2006.01)
  *F16K 11/07*   (2006.01)
  *F16H 61/02*   (2006.01)

(52) U.S. Cl.
  CPC ..... *F16K 31/0613* (2013.01); *F16H 61/0251* (2013.01); *F16K 11/07* (2013.01); *F16K 11/0716* (2013.01); *F16H 2061/0253* (2013.01); *Y10T 137/8667* (2015.04); *Y10T 137/86622* (2015.04)

(58) Field of Classification Search
  CPC ......... F16H 61/0251; F16H 2061/0253; F16K 31/0613; F16K 11/0716; F16K 11/07; Y10T 137/86622; Y10T 137/86694; Y10T 137/8671; Y10T 137/8667

USPC ............. 137/625.65, 625.25, 625.67, 625.69
See application file for complete search history.

(56) References Cited

U.S. PATENT DOCUMENTS

| | | | |
|---|---|---|---|
| 2006/0243938 A1 | 11/2006 | Ishibashi et al. | |
| 2009/0140189 A1* | 6/2009 | Kokubu | F16K 31/0613 251/129.15 |
| 2010/0101653 A1* | 4/2010 | Ogata | F16H 61/12 137/2 |
| 2010/0313980 A1* | 12/2010 | Shimizu | F04B 17/046 137/625.64 |
| 2012/0291900 A1* | 11/2012 | Mizui | F15B 13/0402 137/625.64 |
| 2015/0221427 A1* | 8/2015 | Waterstredt | F16K 31/0675 335/253 |

* cited by examiner

*Primary Examiner* — Kevin Murphy
*Assistant Examiner* — Kelsey Cary
(74) *Attorney, Agent, or Firm* — Nixon & Vanderhye P.C.

(57) ABSTRACT

A spool valve includes a valve housing and a spool. The spool is slidable in an axial direction in the valve housing. A linear solenoid drives the spool against a spring. The valve housing has a feedback chamber to apply a force to the spool, an input port to receive a hydraulic pressure, an output port to produce an output pressure according to an axial position of the spool, and an drain port to exhaust oil to an outside. The spool valve has multiple supply paths to cause oil to flow from the input port to the output port and/or multiple exhaust paths to cause oil to flow from the output port to the drain port.

12 Claims, 7 Drawing Sheets

SOLENOID SPOOL VALVE

CROSS REFERENCE TO RELATED APPLICATION

This application is based on Japanese Patent Application No. 2015-251288 filed on Dec. 24, 2015, the disclosure of which is incorporated herein by reference.

TECHNICAL FIELD

The present disclosure relates to a solenoid spool valve configured to cause a linear solenoid to drive a spool of a spool valve.

BACKGROUND

For example, Patent Literature 1 discloses a driver solenoid spool valve configured to cause a linear solenoid to drive a spool. Downsizing of a solenoid spool valve is demanded to enhance a mountability. A solenoid spool valve is equipped to, for example, a hydraulic pressure control device of an automatic transmission device.

A valve body is equipped inside an automatic transmission device. The valve body has a passage circuit having multiple passages. The valve body is equipped with multiple solenoid spool valves in order to switch the passages and to control a hydraulic pressure. In recent years, downsizing of a solenoid spool valve is demanded with downsizing of an automatic transmission device and/or increasing in the number of stages of the automatic transmission device. In particular, a number of linear solenoids are equipped in a valve body, and therefore, downsizing of the linear solenoids is demanded. In consideration of this, various ideas are proposed to downsize a conventional linear solenoid. However, a limit exists in downsizing of a linear solenoid by enhancing an efficiency of a magnetism in the linear solenoid, and therefore, further downsizing of a linear solenoid is difficult.

PATENT LITERATURE

Publication of Japanese patent No. 4569371

SUMMARY

It is an object of the present disclosure to produce a solenoid spool valve having a downsized structure.

According to an aspect of the present disclosure, a solenoid spool valve comprises a spool valve including a valve housing and a spool. The valve housing has a space in a tubular shape. The spool is supported in the space and is slidable in an axial direction. The spool valve is configured to generate an output hydraulic pressure according to a position of the spool in the axial direction. The solenoid spool valve further comprises a spring biasing the spool to one side in the axial direction. The solenoid spool valve further comprises a linear solenoid configured to drive the spool against a biasing force of the spring. The spool valve has a feedback chamber configured to apply an axial force to the spool in response to the output hydraulic pressure. The valve housing has at least one input port, at least one output port, and at least one drain port. The at least one input port is configured to receive a hydraulic pressure. The at least one output port is configured to produce an output hydraulic pressure according to the position of the spool. The at least one drain port is configured to exhaust oil to an outside. The spool valve has at least one supply path to cause oil to flow from the at least one input port to the at least one output port. The spool valve has at least one exhaust path to cause oil to flow from the at least one output port to the at least one drain port. The at least one supply path includes a plurality of supply paths, and/or the at least one exhaust path includes a plurality of exhaust paths.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
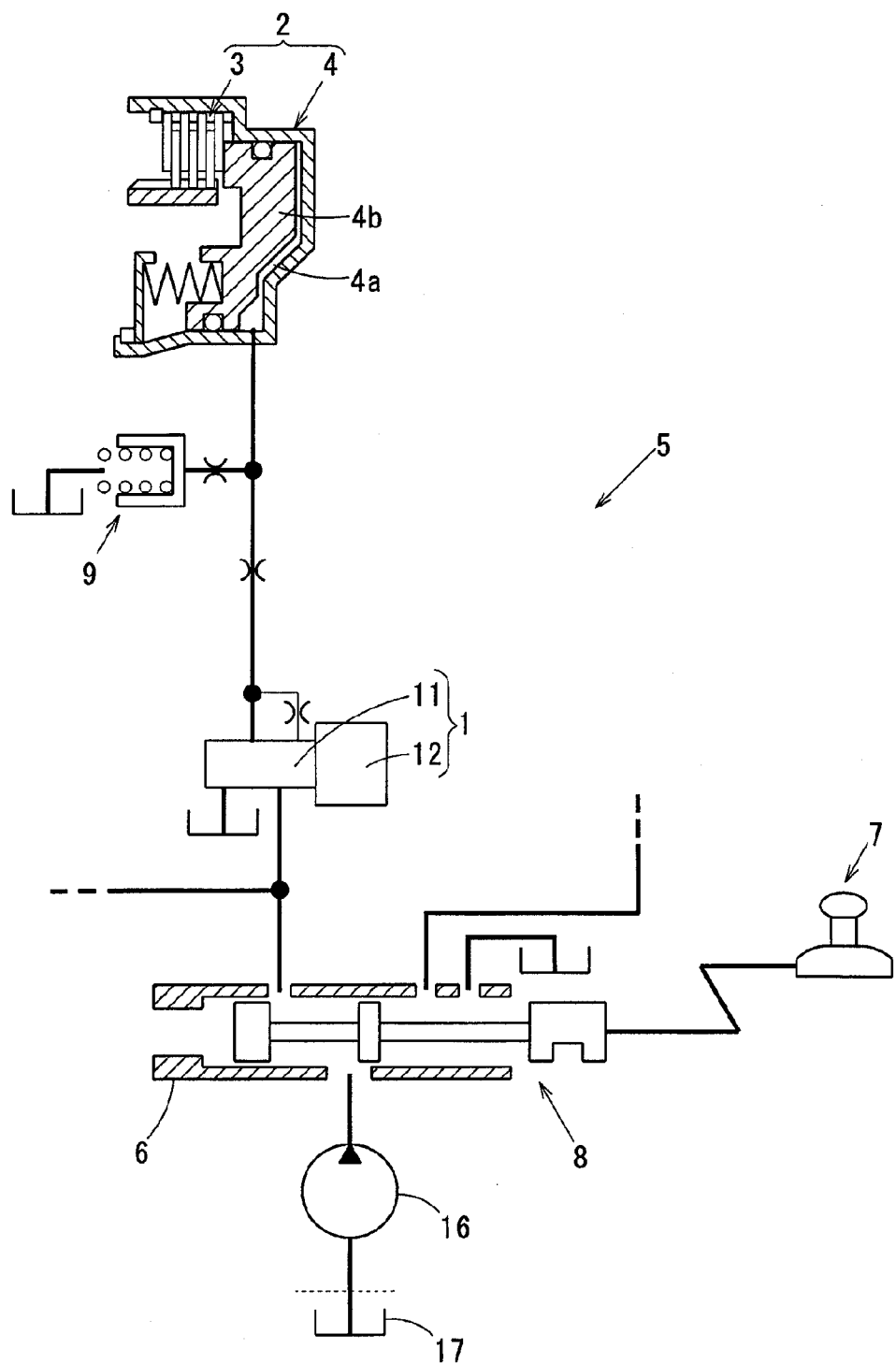
FIG. 1 is a schematic diagram showing an automatic transmission device.

As follows, embodiments of the present disclosure will be described with referent to drawings. The following embodiments are examples, and the present disclosure is not limited to the embodiments.

First Embodiment

The first embodiment will be described with reference to FIGS. 1 to 4D. In the first embodiment, the present disclosure is applied to a solenoid spool valve 1. The solenoid spool valve 1 is employed in a hydraulic pressure control device of an automatic transmission device equipped in an automobile.

The automatic transmission device includes multiple frictional engagement devices 2 to change a transmission gear ratio. Each of the frictional engagement devices 2 may have a generally known configuration to form a clutch device or a brake device. The frictional engagement device 2 includes a frictional element 3 and a hydraulic pressure actuator 4. The frictional element 3 has a multi-board configuration. The hydraulic pressure actuator 4 controls engagement and detachment of the frictional element 3. The hydraulic pressure actuator 4 employs a configuration of a hydraulic actuator. The hydraulic pressure actuator 4 operates a piston 4b on application of a hydraulic pressure supplied to a hydraulic pressure chamber 4a. The piston 4b performs engagement and detachment of the frictional element 3. Specifically, the frictional element 3 performs engagement on increase in the hydraulic pressure in the hydraulic pressure chamber 4a. The engagement of the frictional element 3 is released on decrease in the hydraulic pressure in the hydraulic pressure chamber 4a.

The hydraulic pressure applied to each of the frictional engagement devices 2 is controlled by a hydraulic pressure control device. The hydraulic pressure control device includes a hydraulic pressure control unit 5 and an AT-ECU. The hydraulic pressure control unit 5 is equipped inside the automatic transmission device. The AT-ECU controls the hydraulic pressure control unit 5 electrically.

The hydraulic pressure control unit 5 is configured with a valve body 6. The valve body 6 includes a passage circuit having multiple passages. The valve body 6 is equipped with a manual spool valve 8. The manual spool valve 8 is switched according to a position of a shift lever 7 operated by an occupant. The hydraulic pressure control unit 5 is equipped with the solenoid spool valve 1 correspondingly to each of the frictional engagement devices 2.

Each solenoid spool valve 1 controls the hydraulic pressure applied to the corresponding frictional engagement device 2. A damper 9 is equipped at an intermediate portion in a passage, which connects the frictional engagement device 2 with the solenoid spool valve 1. The damper 9 is to suppress abrupt change in the hydraulic pressure. Each solenoid spool valve 1 employs a configuration in which the spool valve 11 and a linear solenoid 12 are joined to each other in the axial direction.

The spool valve 11 includes a sleeve 13 and a spool 14. The sleeve 13 has a cylindrical space 13a therein. The spool 14 is supported inside the cylindrical space 13a and is slidable in the axial direction. The spool valve 11 causes an output hydraulic pressure in the hydraulic pressure chamber 4a through a passage according to the position of the spool 14 in the axial direction. The spool valve 11 is equipped with a spring 15. The spring 15 biases the spool 14 to one side in the axial direction. The spool valve 11 has a feedback chamber FB to apply an axial force to the spool 14 according to increase in the output hydraulic pressure.

The linear solenoid 12 generates a magnetic force on electricity supply to drive the spool 14 against the biasing force of the spring 15. An example of a configuration of the linear solenoid 12 will be described later in the second embodiment.

The sleeve 13 is one example of a valve housing. The sleeve 13 is in a tubular shape and is configured to be inserted into the valve body 6. The sleeve 13 has an input port, which is applied with a hydraulic pressure caused by the oil pump 16. The sleeve 13 has an output port, which applies an output hydraulic pressure according to the axial position of the spool 14.

The sleeve 13 has a drain port and a breathing hole to exhaust oil to a drain space. The drain space is communicated with an oil sump 17 of the automatic transmission device. The sleeve 13 has a feedback port Pfb, which communicates the output port with the feedback chamber FB.

The spool valve 11 has a supply path, which is a flow path of oil directed from the input port to the output port. The spool valve 11 further has an exhaust path, which is a flow path of oil directed from the output port to the drain port. The spool valve 11 according to the first embodiment has multiple supply paths and/or multiple exhaust paths. Specifically, for example, the spool valve 11 of the first embodiment has two channels of a supply and exhaust path. Specifically, the spool valve 11 of the first embodiment has two channels of the supply path and two channels of the exhaust path. That is, the spool valve 11 has two supply paths and two exhaust paths. The spool valve 11 of the first embodiment has two input ports, two output ports, and two drain ports.

Figure 2:
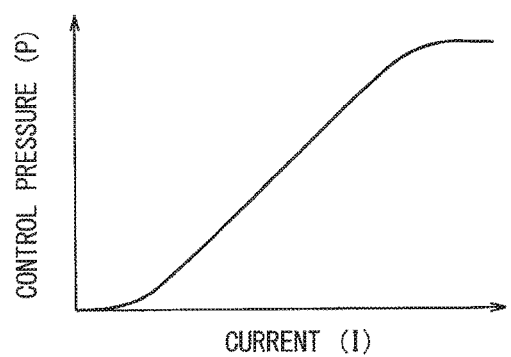
FIG. 2 is a graph showing a relation between a driving current and an output hydraulic pressure.
Figure 3:
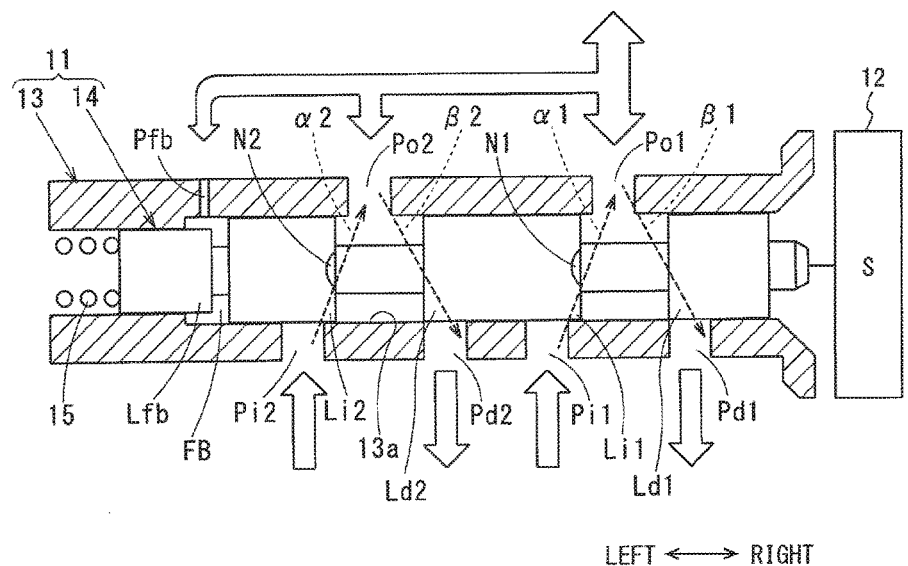
FIG. 3 is a schematic view showing a spool valve.

The first embodiment provides a specific example of the solenoid spool valve 1 having a normally close configuration. Specifically, as shown in FIG. 2, in the normally close configuration, an output hydraulic pressure (control pressure) becomes the minimum when the electric current supplied to the linear solenoid 12 is stopped. In addition, in the normally close configuration, the output hydraulic pressure increases with increase in the electric current (driving current) supplied to the linear solenoid 12.

In the first embodiment, in consideration of convenience of explanation, the movable direction (axial direction) of the spool 14 relative to the sleeve 13 is described as a left to right direction. The left to right direction does not limit an actual mounting direction of the device. Furthermore, in the description, the right side (first side) is on the side of the linear solenoid 12, and a left side (second side) is on the opposite side of the linear solenoid 12 relative to the left to right direction of the spool valve 11. That is, the right side (first side) is closer to the linear solenoid 12, and a left side (second side) is farther from the linear solenoid 12 relative to the left to right direction of the spool valve 11.

In the following description, components and elements of the device will be denoted as follows. One of the two input ports is denoted as a first input port Pi1, and the other is denoted as a second input port Pi2. One of the two output ports is denoted as a first output port Po1, and the other is denoted as a second output port Po2. One of the two drain ports is denoted as a first drain port Pd1, and the other is denoted as a second drain port Pd2. One of the two supply passages is denoted as a first supply passage α1, and the other is denoted as a second supply passage α2. One of the two exhaust passages is denoted as a first exhaust passage β1, and the other is denoted as a second exhaust passage β2.

Each of the ports formed in the sleeve 13 is a through hole extending from the inside of the sleeve 13 to the outside of the sleeve 13 in the radial direction. The sleeve 13 has an inner circumferential periphery having an annular groove communicated with the corresponding port. The ports are arranged from the right side to the left side in the sleeve 13 in the order of the first drain port Pd1, the first output port Po1, the first input port Pi1, the second drain port Pd2, the second output port Po2, the second input port Pi2, and the feedback port Pfb.

A first input land Li1 is equipped in the spool 14 to open and close the first supply path α1 to control the communication degree. A second input land Li2 is equipped in the spool 14 to open and close the second supply path α2 to control the communication degree. A first drain land Ld1 is equipped in the spool 14 to open and close the first exhaust path β1 to control the communication degree. A second drain land Ld2 is equipped in the spool 14 to open and close the second exhaust path β2 to control the communication degree. A feedback land Lfb is equipped in the spool 14. The feedback land Lfb is slightly smaller in the diameter than each of the above-described lands.

In the first embodiment, the first input land Li1 and the second drain land Ld2 are integrated into a singular land. The configuration of the first input land Li1 and the second drain land Ld2 is not limited to the present example. In the integrated singular land, the element on the right side functions as the first input land Li1, and the element on the left side functions as the second drain land Ld2. The lands are arranged from the right side to the left side in the spool 14 in the order of the first drain land Ld1, the first input land Li1, the second drain land Ld2, the second input land Li2, and the feedback land Lfb.

In the present first embodiment, each of the first input land Li1 and the second input land Li2 has a notch in a recessed shape. In the following description, the notch formed in the first input land Li1 is denoted as a first notch N1, and the notch formed in the second input land Li2 is denoted as a second notch N2.

The first notch N1 is a cutout formed in a part of the outer circumferential periphery of a right end of the first input land Li1. The first notch N1 is to quietly communicate between the first input port Pi1 and the first output port Po1. The second notch N2 is a cutout formed in a part of the outer circumferential periphery of a right end of the second input land Li2. The second notch N2 is to quietly communicate between the second input port Pi2 and the second output port Po2.

It is noted that, the physical relationship between the first input port Pi1 and the first input land Li1 and the physical relationship between the first drain port Pd1 and the first drain land Ld1 are set to form the normally close configuration. The present configuration will be specifically described as follows. In the following example, electricity supply of the linear solenoid 12 is initially terminated, and subsequently, the driving current supplied to the linear solenoid 12 is gradually increased to slide the spool 14 from the right side to the left side.

While the spool 14 moves from a stop position on the right side to a maximum slide position on the left side, each land switches an opening-and-closing state of the corresponding port. While the spool 14 slides from the right side to the left side to change the opening-and-closing state of the ports, the device is in one of a drain opening region i, an overlap region ii, a notch opening region iii, and a supply opening region iv.

In the following description, a line A1 shows a hydraulic pressure radius of the first exhaust path β1, and a line A2 shows the hydraulic pressure radius of the first supply path α1. Similarly, a line B1 shows the hydraulic pressure radius of the second exhaust path β2, and a line B2 shows the hydraulic pressure radius of the second supply path α2. A line C1 shows a total hydraulic pressure radius of the first exhaust path β1 and the second exhaust path β2. A line C2 shows the total hydraulic pressure radius of the first supply path α1 and the second supply path α2. It is noted that, the hydraulic pressure radius represents a communication degree in consideration of a pressure loss. The hydraulic pressure radius may simply represent an opening area.

In the drain opening region i, the first supply path α1 is closed by the first input land Li1, and the first exhaust path β1 is opened by the first drain land Ld1. As the spool 14 slides to the left side, the first exhaust path β1 is gradually closed by the first drain land Ld1. In the present state, the pump hydraulic pressure applied to the first input port Pi1 is partially applied through a gap, which is between the first input land Li1 and the sleeve 13, to the first output port Po1.

Therefore, as the spool 14 slides to the left side, the output hydraulic pressure of the first output port Po1 increases. That is, as shown by the dashed line A1 in FIG. 4D, as the spool 14 slides to the left side, the hydraulic pressure radius of the first exhaust path β1 gradually becomes smaller thereby to increase the output hydraulic pressure of the first output port Po1. In other words, as the spool 14 slides to the left side, the communication between the first output port Po1 and the first drain port Pd1 decreases thereby to decrease the amount of oil exhausted from the first output port Po1 to increase the output hydraulic pressure of the first output port Po1. That is, the slide of the first drain land Ld1 to the left side decreases the communication degree of the first exhaust path β1 and increases the output hydraulic pressure of the first output port Po1.

In the overlap region ii, the first supply path α1 is closed by the first input land Li1, and the first exhaust path β1 is also closed by the first drain land Ld1. In the present state, the pump hydraulic pressure applied to the first input port Pi1 is partially applied through a gap, which is between the first input land Li1 and the sleeve 13, to the first output port Po1. In addition, the hydraulic pressure between the first input land Li1 and the first drain land Ld1 is partially released through the gap, which is between the first drain land Ld1 and the sleeve 13, and the first drain port Pd1 into the drain space. Therefore, as the spool 14 slides to the left side, a seal length of each gap varies in the axial direction. In the present state, the output hydraulic pressure of the first output port Po1 increases further than that in the above-described drain opening region i.

In the notch opening region iii, the first exhaust path β1 is closed by the first drain land Ld1, and the first supply path α1 is opened by the first notch N1. As the spool 14 slides to the left side gradually, the communication degree between the first input port Pi1 and the first output port Po1 through the first notch N1 increases, thereby to increase the output hydraulic pressure of the first output port Po1 further than that in the above-described overlap region ii. That is, as shown by the dashed line A2 in FIG. 4D, as the spool 14 slides to the left side, the hydraulic pressure radius of the first supply path α1 gradually becomes larger thereby to increase the output hydraulic pressure. In other words, the slide of the first notch N1 to the left side increases the communication degree of the first supply path α1 and increases the output hydraulic pressure of the first output port Po1.

In the supply opening region iv, the first exhaust path β1 is closed by the first drain land Ld1, and the first supply path α1 is opened by the first input land Li1. As the spool 14 slides to the left side gradually, the communication degree between the first input port Pi1 and the first output port Po1 further increases, thereby to increase the output hydraulic pressure of the first output port Po1 further than that in the above-described notch opening region iii. That is, as shown by the dashed line A2 in FIG. 4D, as the spool 14 slides to the left side, the hydraulic pressure radius of the first supply path α1 gradually becomes larger thereby to increase the output hydraulic pressure. In other words, the slide of the first input land Li1 to the left side increases the communication degree of the first supply path α1 and increases the output hydraulic pressure of the first output port Po1.

Similarly to the above, the physical relationship between the second input port Pi2 and the second input land Li2 and the physical relationship between the second drain port Pd2 and the second drain land Ld2 are set to form the normally close configuration. The present configuration will be specifically described as follows.

In the drain opening region i, as the spool 14 slides to the left side, the second exhaust path β2 is gradually closed by the second drain land Ld2. In the present state, the pump hydraulic pressure applied to the second input port Pi2 is partially applied through a gap, which is between the second input land Li2 and the sleeve 13, to the second output port Po2. Therefore, as the spool 14 slides to the left side, the output hydraulic pressure of the second output port Po2 increases. That is, as shown by the dashed line B1 in FIG. 4D, as the spool 14 slides to the left side, the hydraulic pressure radius of the second exhaust path β2 gradually becomes smaller thereby to increase the output hydraulic pressure. In other words, the slide of the second drain land Ld2 to the left side decreases the communication degree of the second exhaust path β2 and increases the output hydraulic pressure of the second output port Po2.

In the overlap region ii, the pump hydraulic pressure applied to the second input port Pi2 is partially applied through a gap, which is between the second input land Li2 and the sleeve 13, to the second output port Po2. In addition, the hydraulic pressure between the second input land Li2 and the second drain land Ld2 is partially released through the gap, which is between the second drain land Ld2 and the sleeve 13, and the second drain port Pd2 into the drain space. Therefore, as the spool 14 slides to the left side, a seal length of each gap varies in the axial direction. In the present state, the output hydraulic pressure of the second output port Po2 increases further than that in the above-described drain opening region i.

In the notch opening region iii, as the spool 14 slides to the left side gradually, the communication degree between the second input port Pi2 and the second output port Po2 through the second notch N2 increases, thereby to increase the output hydraulic pressure of the second output port Po2 further than that in the above-described overlap region ii. That is, as shown by the dashed line B2 in FIG. 4D, as the spool 14 slides to the left side, the hydraulic pressure radius of the second supply path α2 gradually becomes larger thereby to increase the output hydraulic pressure. In other words, the slide of the second notch N2 to the left side increases the communication degree of the second supply path α2 and increases the output hydraulic pressure of the second output port Po2.

In the supply opening region iv, as the spool 14 slides to the left side gradually, the communication degree between the second input port Pi2 and the second output port Po2 further increases, thereby to increase the output hydraulic pressure of the second output port Po2 further than that in the above-described notch opening region iii. That is, as shown by the dashed line B2 in FIG. 4D, as the spool 14 slides to the left side, the hydraulic pressure radius of the second supply path α2 gradually becomes larger thereby to increase the output hydraulic pressure. In other words, the slide of the second input land Li2 to the left side increases the communication degree of the second supply path α2 and increases the output hydraulic pressure of the second output port Po2.

The first output port Po1 and the second output port Po2 are communicated inside the valve body 6. As the output hydraulic pressure of the second output port Po2 becomes larger, the hydraulic pressure of the feedback chamber FB becomes larger. In this way, a pressure occurs due to the difference between the area of the feedback land Lfb and the area of the second input land Li2 (second drain land Ld2). The pressure causes an axial force to the right side against the driving force applied from the linear solenoid 12 to the spool 14. The present configuration controls the movement of the spool 14.

Herein, the linear solenoid 12 applies the axial force as the driving force to the spool 14. The spring 15 applies the axial force as the spring force to the spool 14. The hydraulic pressure in the feedback chamber FB applies the axial force as the feedback force to the spool 14. In the present configuration, the spool 14 is balanced by application of the axial forces such that driving force=spring force+feedback force.

The AT-ECU performs the electricity supply control on the linear solenoid 12. The AT-ECU may be a control unit using a microcomputer. The AT-ECU performs, for example, a duty ratio control thereby to control an amount of electricity supplied to the linear solenoid 12. That is, the AT-ECU controls the amount of electricity supplied to each of the linear solenoids 12 thereby to control the hydraulic pressure applied to each of the frictional engagement devices 2.

Effect of First Embodiment

As described above, the spool valve 11 of the first embodiment has the two channels of the supply path (i.e., two supply paths) and the two channels of the exhaust path (i.e., two exhaust paths). In other words, the spool valve 11 has the two channels of the supply and exhaust path (i.e., two supply and exhaust paths). Specifically, the spool valve 11 has the first supply path α1, the second supply path α2, the first exhaust path β1, and the second exhaust path β2. More specifically, the spool valve 11 of the first embodiment has the two input ports, the two output ports, and the two drain ports, The present configuration enables to reduce the opening area of each port as compared with a conventional configuration. As follows, a comparison between the first embodiment shown in FIGS. 4B and 4D and a conventional configuration shown in FIGS. 4A and 4C will be made. A spool valve 11 according to the conventional configuration shown in FIG. 4A has a singular supply path and a singular exhaust path. The spool 14 of the first embodiment can be reduced in the diameter compared with the conventional configuration in a case where the hydraulic pressure radius is the same in both the first embodiment and the conventional configuration.

Figure 4A:
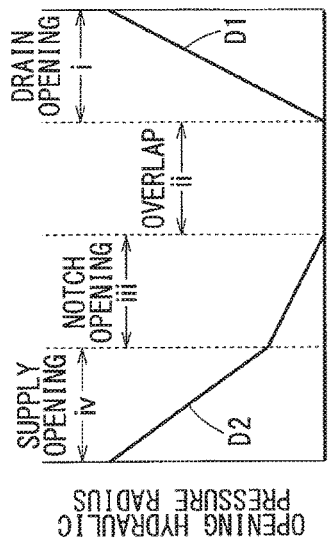
FIG. 4A is a schematic view showing the configuration of a spool valve having a conventional configuration.
Figure 4C:
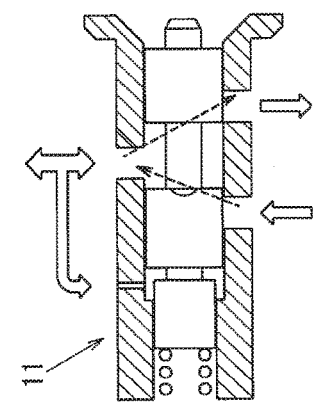
FIG. 4C is a graph showing a relation between a stroke of a spool and a hydraulic pressure radius in the spool valve having the conventional configuration.
Figure 4B:
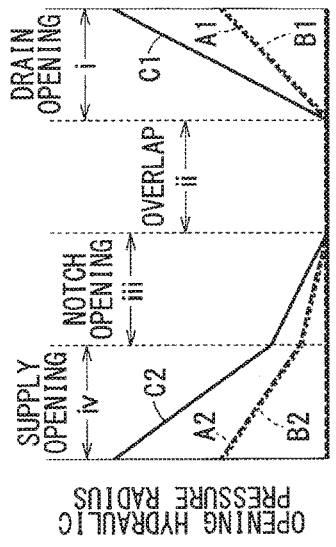
FIG. 4B is a schematic view showing the configuration of the spool valve of the first embodiment.

As follows, detail of the comparison will be described more specifically. FIG. 4A shows the spool valve 11 having the conventional configuration shown for the comparison. The spool valve 11 according to the conventional configuration shown in FIG. 4A has the singular supply path and the singular exhaust path. In FIG. 4C, the solid line D1 and the solid line D2 show changes in the hydraulic pressure radius in the spool valve 11 having the conventional configuration with the singular supply path and the singular exhaust path. Specifically, the solid line D1 shows the change in the hydraulic pressure radius in the singular exhaust path, and the solid line D2 shows the change in the hydraulic pressure radius in the singular supply path.

Figure 4D:
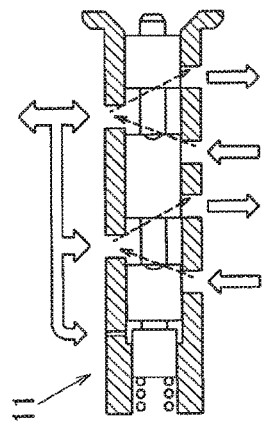
FIG. 4D is a graph showing a relation between a stroke of a spool and a hydraulic pressure radius in the spool valve of the first embodiment.

The spool valve 11 of the first embodiment includes the spool 14 having the diameter, which is determined such that a total hydraulic pressure radius, which is a summation of the hydraulic pressure radius of each path, is the same as the hydraulic pressure radius of the spool valve 11 having the conventional configuration. In FIG. 4D, the solid line C1 shows the total hydraulic pressure radius, which is a summation of the hydraulic pressure radius of the first exhaust path β1 shown by the dashed line A1 and the hydraulic pressure radius of the second exhaust path β2 shown by the dashed line B1. The solid line C2 shows the total hydraulic pressure radius, which is a summation of the hydraulic pressure radius of the second exhaust path β2 shown by the dashed line A2 and the hydraulic pressure radius of the second exhaust path β2 shown by the dashed line B2. The diameter of the spool 14 of the first embodiment is determined such that the solid line C1 and the solid line C2 are substantially identical to the solid line D1 and the solid line D2, respectively. The present configuration enables to reduce the diameter of the spool 14 compared with that of the conventional configuration.

The reduction in the diameter of the spool 14 enables to reduce a resistance such as a friction caused when the spool 14 is driven. In this way, the driving force of the spool 14 required to the linear solenoid 12 can be reduced thereby to enable to downsize the linear solenoid 12.

The present configuration enables to downsize the linear solenoid 12 thereby to enhance a mountability of the solenoid spool valve 1 as compared with the conventional configuration. Specifically, the downsizing of the linear solenoid 12 enables to satisfy a demand to downsize the automatic transmission device. In addition, in a case where an automatic transmission device has a greater number of gear ratios and a greater number of the solenoid spool valves 1 equipped in the valve body 6, the downsizing of each linear solenoid 12 enables to increase the number of the solenoid spool valves 1 equipped in the valve body 6.

Second Embodiment

Figure 5:
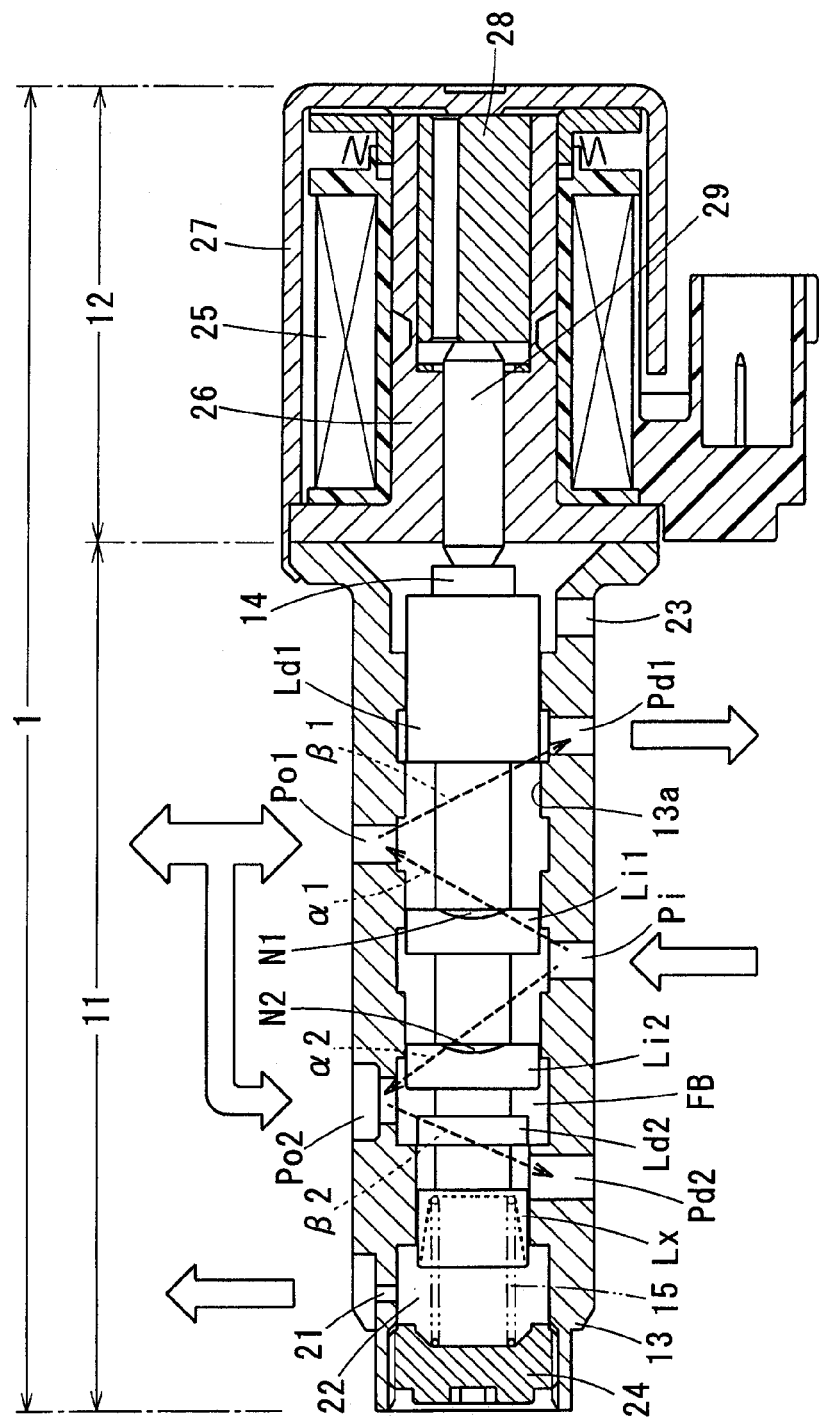
FIG. 5 is a sectional view showing a solenoid spool valve according to a second embodiment.
Figure 6A:
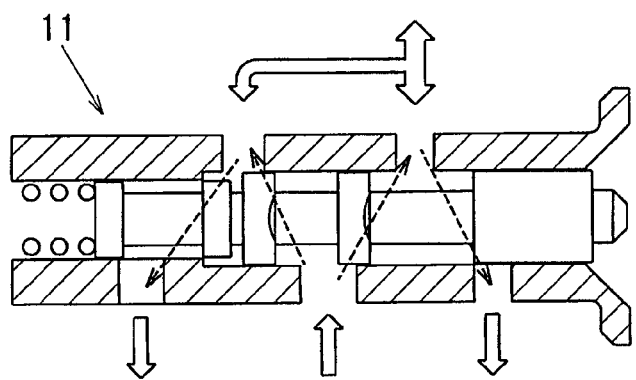
FIG. 6A is a schematic view showing the configuration of a spool valve of the second embodiment.
Figure 6B:
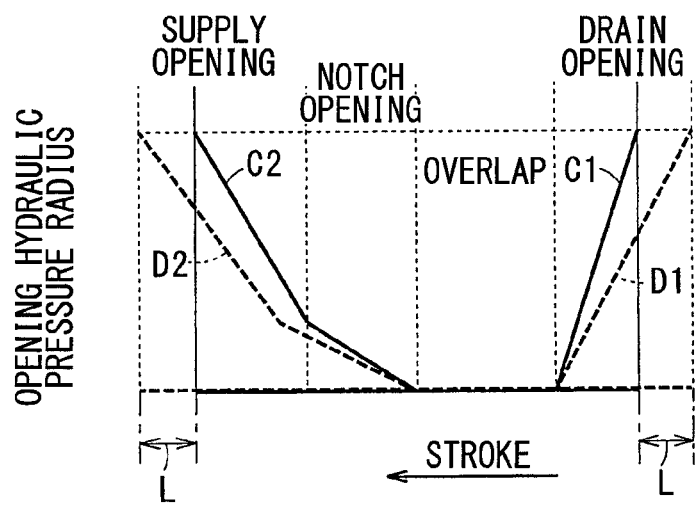
FIG. 6B is a graph showing a relation between a stroke of a spool and a hydraulic pressure radius in the spool valve of the second embodiment.

The second embodiment will be described with reference to FIGS. 5 to 6B. In the following description, the same reference numerals as those in the first embodiment denote equivalent functional elements to those in the first embodiment, respectively. In the following description, configurations modified from and/or additional to those in the first embodiment will be described. As for configurations, which are not described in the second embodiment, the previous description for the not-described configurations will be applied in the second embodiment.

Similarly to the first embodiment, the solenoid spool valve 1 according to the second embodiment employs the normally close configuration. Similarly to the first embodiment, the spool valve 11 of the second embodiment has two channels of the supply and exhaust paths. That is, the spool valve 11 of the second embodiment has the two channels of the supply path and the two channels of the exhaust path. Specifically, the spool valve 11 of the second embodiment has the first supply path α1, the first exhaust path β1, the second supply path α2, and the second exhaust path β2.

Dissimilarly to the first embodiment, the spool valve 11 of the second embodiment has a singular (one) input port. That is, the spool valve 11 of the second embodiment has the one input port, the two output ports, and the two drain ports. Specifically, in the second embodiment, the input port of the first supply path α1 and the input port of the second supply path α2 are provided in common. In the following description, the common input port is referred to as a common input port Pi. Furthermore, according to the second embodiment, one of the two channels of the supply path and one of the two channels of the exhaust path pass through the feedback chamber FB. Specifically, as shown in FIG. 5, the configuration of the second embodiment has the second output port Po2, which also serves as the feedback port Pfb described in the first embodiment. In the present configuration, both of the second supply path α2 and the second exhaust path β2 pass through the feedback chamber FB.

The ports of the sleeve 13 are arranged from the right side to the left side in the sleeve 13 in the order of the first drain port Pd1, the first output port Po1, the common input port Pi, the second output port Po2, and the second drain port Pd2.

A through hole 21 is formed on the left side of the second drain port Pd2. The through hole 21 extends in the radial direction to communicate a spring chamber 22, in which the spring 15 is located, with the drain space. The through hole 21 has a small diameter to suppress abrupt volume change in the spring chamber 22. A through hole 23 is formed on the right side of the first drain port Pd1. The through hole 23 extends in the radial direction to serve as a breathing hole.

The lands of the spool 14 are arranged from the right side to the left side in the spool 14 in the order of the first drain land Ld1, the first input land Li1, the second input land Li2, and the second drain land Ld2.

The first input land Li1, the first drain land Ld1, and the second input land Li2 have the same diameter, which is a large diameter. The second drain land Ld2 has a diameter, which is slightly smaller than the diameter of the second input land Li2 adjacent to the second drain land Ld2. A spring seat land Lx is equipped on the left side of the second drain land Ld2. The spring seat land Lx has a diameter same as the diameter of the second drain land Ld2.

Similarly to the first embodiment, according to the second embodiment, the first input land Li1 has the first notch N1, and the second input land Li2 has the second notch N2. The physical relationship between the common input port Pi and the first input land Li1 and the physical relationship between the first drain port Pd1 and the first drain land Ld1 are determined to form the normally close configuration. The physical relationship between the common input port Pi and the second input land Li2 and the physical relationship between the second drain port Pd2 and the second drain land Ld2 are determined to form the normally close configuration.

Similarly to the first embodiment, according to the second embodiment, while the spool 14 slides from the right side to the left side to change the opening-and-closing state of the ports, the device is in one of the drain opening region i, the overlap region ii, the notch opening region iii, and the supply opening region iv. Details of the switching of the regions are substantially the same as those in the first embodiment, and description thereof is omitted.

The spring 15 is a compression coil spring in a tubular spiral form to bias the spool 14 toward the right side. The spring 15 is seated on the bottom surface of a recessed portion at the end on the right side. The recessed portion is formed in the spring seat land Lx. The spring 15 is seated on a control screw 24 at the end on the left side. The control screw 24 is screwed into the left end of the sleeve 13. Specifically, the left end of the spring 15 is seated on the bottom surface of a recessed portion formed in the control screw 24. The spring 15 is compressed in the spring chamber 22 between the control screw 24 and the spring seat land Lx.

The linear solenoid 12 is connected to the end of the sleeve 13 on the right side to move the spool 14 toward the left side according to an amount of electricity supply. The linear solenoid 12 may have a generally known configuration. The linear solenoid 12 includes a coil 25, a stator 26, a yoke 27, a plunger 28, and/or the like. The coil 25 generates a magnetic force according to the amount of electricity supply. The stator 26 and the yoke 27 form a magnetic flux loop. The plunger 28 is driven to the left side on generation of the magnetic force by the coil 25.

A bar-shaped pushrod 29 is supported at a center portion of the stator 26 and is slidable in the axial direction. In the present configuration, as the amount of electricity supply to the coil 25 increases, the plunger 28 is moved to the left side, and the pushrod 29 is slid via the spool 14 to the left side. It is noted that, the cross-sectional configuration of the linear solenoid 12 shown in the drawing is one example. The configuration of the linear solenoid 12 is not limited to the example in the drawing.

Effect 1 of the Second Embodiment

The spool valve 11 of the second embodiment has the input port, which is less in number than those of the first embodiment. In addition, in the spool valve 11 of the second embodiment, the second output port Po2 also serves as the feedback port Pfb described in the first embodiment. Therefore, the spool valve 11 may be downsized in the axial direction compared with that of the first embodiment.

Effect 2 of the Second Embodiment

The second embodiment enables to reduce a stroke range of the spool 14 on the premise that the diameter of the spool 14 is substantially the same as that of a conventional configuration.

Details will be described as follows. In a configuration where the diameter of the spool 14 is substantially the same as that of the conventional configuration, the opening area of each port becomes substantially the same as that of the conventional configuration. Therefore, even in the configuration where the stroke of the spool 14 is small, change in the hydraulic pressure radius becomes larger.

The difference will be described further in detail with reference to FIGS. 6A and 6B. As shown by the solid lines C1 and C2 in FIG. 6B, the configuration of the second embodiment enables to cause a large change in the hydraulic pressure radius with a small stroke of the spool 14. Therefore, the second embodiment enables to reduce the stroke range of the spool 14 by the amount shown by the arrows L in FIG. 6B compared with the conventional configuration. The present configuration enables to reduce the output stroke of the linear solenoid 12 and enables to downsize the linear solenoid. The downsizing of the linear solenoid 12 further enables to enhance a mountability of the solenoid spool valve 1 similarly to the first embodiment.

Third Embodiment

Figure 7:
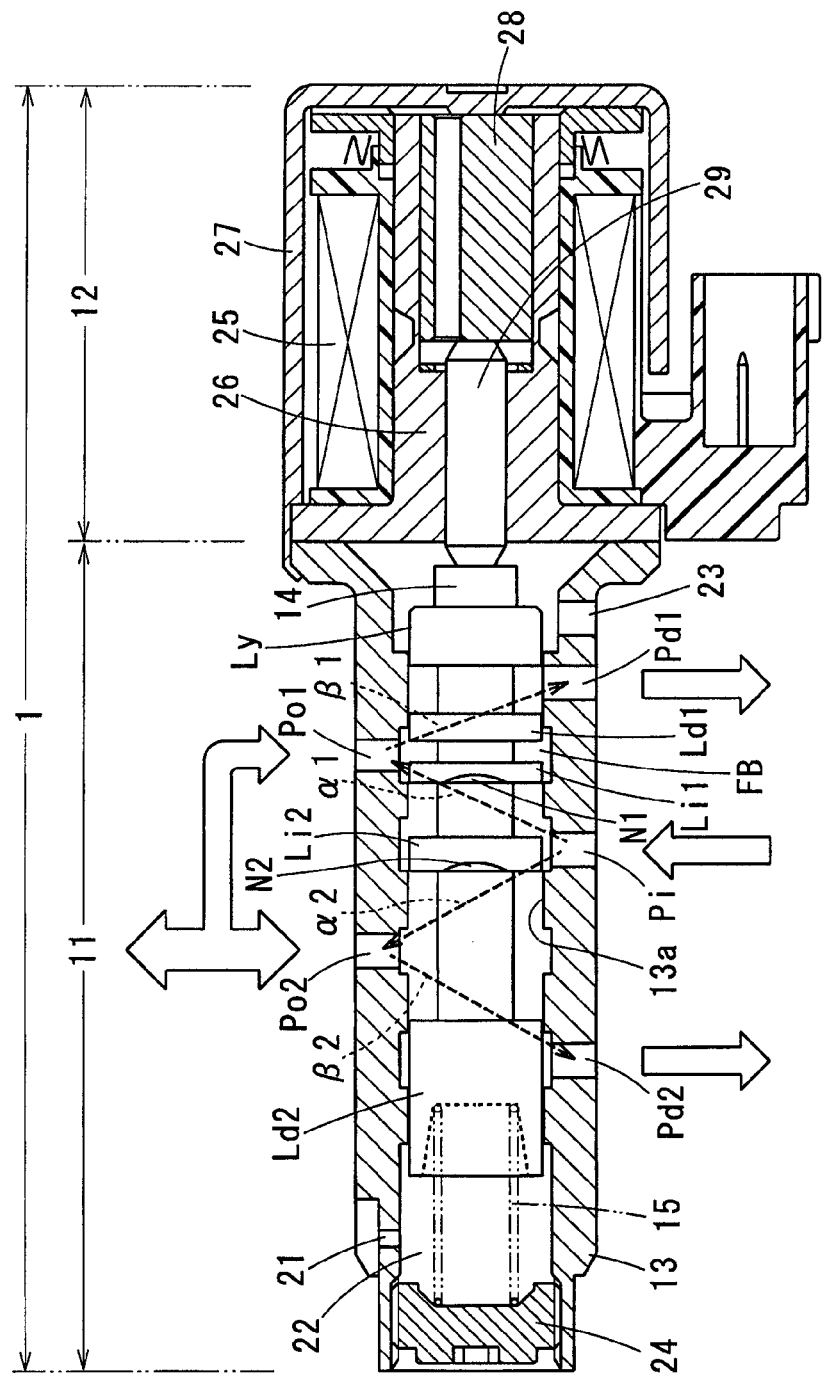
FIG. 7 is a sectional view showing a solenoid spool valve according to a third embodiment.

The third embodiment will be described with reference to FIG. 7. The solenoid spool valve 1 according to the third embodiment employs a normally open configuration. Specifically, in the present configuration, the output hydraulic pressure becomes the maximum when the electricity supply to the linear solenoid 12 is stopped, and the output hydraulic pressure decreases as the driving current supplied to the linear solenoid 12 increases.

Similarly to the first embodiment, the spool valve 11 of the third embodiment has two channels of the supply and exhaust paths. That is, the spool valve 11 of the third embodiment has the two channels supply and exhaust paths. More specifically, the spool valve 11 of the third embodiment has the two channels of the supply path and the two channels of the exhaust path. In addition, similarly to the second embodiment, the spool valve 11 of the third embodiment has one input port, one output port, and two drain ports. Furthermore, according to the third embodiment, similarly to the second embodiment, one of the two channels of the supply path and one of the two channels of the exhaust path pass communicate with the feedback chamber FB. FIG. 7 shows a specific embodiment of the third embodiment. As shown in FIG. 7, the first output port Po1 also serves as the feedback port Pfb described in the first embodiment. Both of the first supply path α1 and the first exhaust path β1 passes through the feedback chamber FB.

Similarly to the second embodiment, the ports are arranged from the right side to the left side in the sleeve 13 in the order of the first drain port Pd1, the first output port Po1, the common input port Pi, the second output port Po2, and the second drain port Pd2.

Similarly to the second embodiment, the lands are arranged from the right side to the left side in the spool 14 in the order of the first drain land Ld1, the first input land Li1, the second input land Li2, and the second drain land Ld2.

Dissimilarly to the second embodiment, the first input land Li1, the second input land Li2, and the second drain land Ld2 have the same large diameter. The first drain land Ld1 has the diameter, which is slightly smaller than the diameter of the first input land Li1 adjacent to the first drain land Ld1. A partition land Ly is located on the right side of the first drain land Ld1. The partition land Ly has the diameter, which is the same as the diameter of the first drain land Ld1.

The physical relationship between the common input port Pi and the first input land Li1 and the physical relationship between the first drain port Pd1 and the first drain land Ld1 are determined to form the normally open configuration. The physical relationship between the common input port Pi and the second input land Li2 and the physical relationship between the second drain port Pd2 and the second drain land Ld2 are determined to form the normally open configuration.

According to the third embodiment, while the spool 14 slides from the right side to the left side to change the opening-and-closing state of the ports, the device is in one of the supply opening region iv, the notch opening region iii, the overlap region ii, and the drain opening region i, oppositely to the first embodiment. Details of the changing of the regions are the opposite from those in the first embodiment, and description thereof is omitted.

Effect of Third Embodiment

Even in the case where the present disclosure is applied to the solenoid spool valve 1 having the normally open configuration, effect equivalent to those of the first embodiment and the second embodiment can be produced.

Fourth Embodiment

The fourth embodiment will be described with reference to FIG. 7. The basic configuration of the spool valve 11 according to the fourth embodiment is equivalent to that of the spool valve 11 of the above-described second embodiment. The fourth embodiment employs a configuration, which is a partial modification of the spool 14 of the second embodiment. As follows, the modified configuration will be described. The spool 14 of the fourth embodiment does not have the notch described in the first embodiment.

The spool 14 is at a first opening position x1 in the axial direction at which the state, in which the first supply path α1 is closed by the first input land Li1, is changed to a state where the first supply path α1 is opened. The spool 14 is at a second opening position x2 in the axial direction at which the state, in which the second supply path α2 is closed by the second input land Li2, is changed to a state where the second supply path α2 is opened. The spool 14 is at a first closing position y1 in the axial direction at which the state, in which the first exhaust path β1 is opened by the first drain land Li1, is changed to a state where the first exhaust path β1 is closed. The spool 14 is at a second closing position y2 in the axial direction at which the state, in which the second exhaust path β2 is opened by the second drain land Li2, is changed to a state where the second exhaust path β2 is closed.

In the fourth embodiment, the first opening position x1 and the second opening position x2 are different from each other, and the first closing position y1 and the second closing position y2 are the same as each other.

Figure 8A:
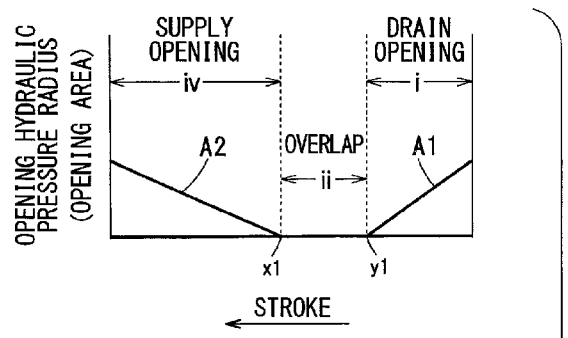
FIG. 8A is a graph showing a relation between a stroke of a spool and a hydraulic pressure radius in a first supply path and a first exhaust path in a spool valve.
Figure 8B:
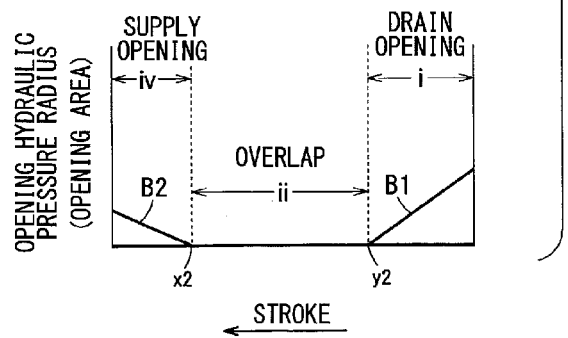
FIG. 8B is a graph showing a relation between the stroke of the spool and the hydraulic pressure radius in a second supply path and a second exhaust path in the spool valve.

Specifically, as shown by the solid line A2 in FIG. 8A, the first opening position x1 is determined such that the supply opening region iv is increased, and conversely, the overlap region ii is reduced. On the other hand, as shown by the solid line B2 in FIG. 8B, the second opening position x2 is determined such that the supply opening region iv is reduced, and conversely, the overlap region ii is increased. The second opening position x2 is set on the left side of the first opening position x1.

Figure 8C:
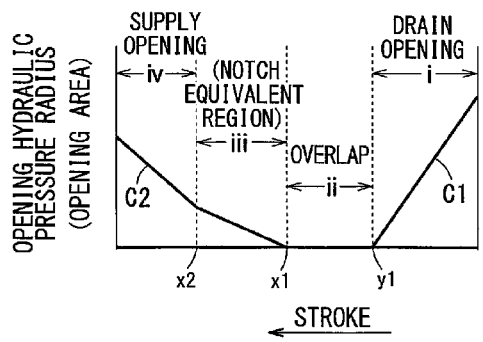
FIG. 8C is a graph showing a relation between the stroke of the spool and the hydraulic pressure radius in the spool valve of the third embodiment.

In a stroke region of the spool 14 from the first position x1 to the second opening position x2, a state, in which the second supply path α2 is closed by the second input land Li2, is maintained. Therefore, in the stroke region of the spool 14 from the first position x1 to the second opening position x2, change in the output hydraulic pressure is suppressed, even the spool 14 strokes to move. That is, as shown by the solid line C2 in FIG. 8C, the present configuration enables to have a notch equivalent region to produce an effect equivalent to the effect produced by a configuration having the notch. The present configuration enables the stroke region of the spool 14, which is from the first position x1 to the second opening position x2, to be equivalent to the notch opening region iii in the above-described first embodiment.

Effect of Fourth Embodiment

The spool valve 11 of the fourth embodiment does not form the notch in the spool 14. It is noted that, as described above with reference to the solid line C2, the fourth embodiment enables to produce the change in the hydraulic pressure radius similarly to the configuration where the notch is formed. The present configuration does not form the notch in the spool 14, and therefore, the present configuration enables to simplify a manufacturing process of the spool 14.

The fourth embodiment provides the example, in which the first closing position y1 and the second closing position y2 are at the same position. It is noted that, the first closing position y1 and the second closing position y2 may be at different positions. The configuration of the fourth embodiment may be applied to the first embodiment and/or the third embodiment.

Other Embodiment

The embodiments provide examples in which two channels of the supply path and the two channels of the exhaust path are formed. The present disclosure is not limited to the examples. Three or more channels of the supply path may be provided. Three or more channels of the exhaust path may be provided. In another embodiment, multiple channels of the supply path may be formed, and a singular exhaust path may be formed. In another embodiment, a singular supply path may be formed, and multiple channels of the exhaust path may be formed.

In the above embodiments, the spool valve 11 employs the sleeve 13, which is one example of the valve housing. It is noted that, the present disclosure may be applied to the spool valve 11 in which the spool 14 is directly inserted in the valve body 6, which is one example of the valve housing.

In the above embodiments, the present disclosure is applied to the solenoid spool valve 1 used for an automatic transmission device. It is noted that, the present disclosure may be applied to the solenoid spool valve 1, which controls a hydraulic pressure in a device other than the automatic transmission device.

As described above, the spool valve has the multiple supply paths and/or the multiple exhaust paths. The present configuration enables to reduce the diameter of the spool and to reduce a driving resistance of the spool. In this way, the driving force of the spool, which is required to the linear solenoid, can be reduced, and the linear solenoid can be downsized. In addition or alternatively, the stroke range of the spool can be shortened. The present configuration enables to reduce the stroke of the output shaft of the linear solenoid and enables to downsize the linear solenoid.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A solenoid spool valve comprising:
a spool valve including a valve housing and a spool, the valve housing having a space in a tubular shape, the spool being supported in the space and being slidable in an axial direction, the spool valve configured to generate an output hydraulic pressure according to a position of the spool in the axial direction;
a spring biasing the spool to one side in the axial direction; and
a linear solenoid configured to drive the spool against a biasing force of the spring, wherein
the spool valve has a feedback chamber configured to apply an axial force to the spool in response to the output hydraulic pressure,
the valve housing has at least one input port, at least one output port, and at least one drain port,
the at least one input port is configured to receive a hydraulic pressure,
the at least one output port is configured to produce an output hydraulic pressure according to the position of the spool,
the at least one drain port is configured to exhaust oil to an outside,
the spool valve has at least one supply path to cause oil to flow from the at least one input port to the at least one output port, the spool valve has at least one exhaust path to cause oil to flow from the at least one output port to the at least one drain port, wherein the at least one output port includes a first output port and a second output port, the at least one drain port includes a first drain port and a second drain port, the at least one supply path includes a first supply path and a second supply path, the first supply path is configured to communicate the at least one input port with the first output port, the second supply path is configured to communicate the at least one input port with the second output port, the at least one exhaust paths includes a first exhaust path and a second exhaust path, the first exhaust path is configured to communicate the first output port with the first drain port, the second exhaust path is configured to communicate the second output port with the second drain port, the spool includes a first input land, a second input land, a first drain land, and a second drain land, the first input land is configured to open and close the first supply path to control a communication of the first supply path, the second input land is configured to open and close the second supply path to control a communication of the second supply path, the first drain land is configured to open and close the first exhaust path to control a communication of the first exhaust path, and the second drain land is configured to open and close the second exhaust path to control a communication of the second exhaust path.

2. The solenoid spool valve according to claim 1, wherein the at least one input port includes two input ports.

3. The solenoid spool valve according to claim 2, wherein the solenoid spool valve has a normally closed configuration to produce an output hydraulic pressure, which becomes minimum when electricity supply to the linear solenoid stops, the two input ports includes a first input port and a second input port, with respect to the movable direction of the spool relative to the valve housing, a first side is on a side of the linear solenoid, and a second side is on an opposite side of the first side, the first drain port, the first output port, the first input port, the second drain port, the second output port, and the first input port are arranged from the first side to the second side in the valve housing, and the first drain land, the first input land, the second drain land, and the second input land are arranged from the first side to the second side in the spool.

4. The solenoid spool valve according to claim 1, wherein the at least one input port includes one input port,
the at least one output port includes two output ports, and
the at least one drain port includes two drain ports.

5. The solenoid spool valve according to claim 1, wherein one of the first supply path and the second supply path and one of the first exhaust path and the second exhaust path pass through the feedback chamber.

6. The solenoid spool valve according to claim 1, wherein the at least one supply path includes two supply paths including the first supply path and the second supply path, the first supply path being closed is opened when the spool is at a first supply axial position, the second supply path being closed is opened when the spool is at a second supply axial position, and the first supply axial position is different from the second supply axial position.

7. The solenoid spool valve according to claim 1, wherein the at least one exhaust path includes two exhaust paths including the first exhaust path and the second exhaust path, the first exhaust path being closed is opened when the spool is at a first exhaust axial position, the second exhaust path being closed is opened when the spool is at a second exhaust axial position, and the first exhaust axial position is different from the second exhaust axial position.

8. The solenoid spool valve according to claim 1, wherein the solenoid spool valve is equipped in a hydraulic pressure control unit equipped inside an automatic transmission device of an automobile.

9. The solenoid spool valve according to claim 1, wherein the valve housing is in a tubular shape.

10. The solenoid spool valve according to claim 1, wherein the spool is configured to communicate the first supply path and the second supply path simultaneously, and the spool is configured to communicate the first exhaust path and the second exhaust path simultaneously.

11. The solenoid spool valve according to claim 1, wherein the spool is configured to communicate the first supply path and the second supply path simultaneously while blocking the first exhaust path and the second exhaust path, and the spool is configured to communicate the first exhaust path and the second exhaust path simultaneously while blocking the first supply path and the second supply path.

12. A solenoid spool valve comprising:

a spool valve including a valve housing and a spool, the valve housing having a space in a tubular shape, the spool being supported in the space and being slidable in an axial direction, the spool valve configured to generate an output hydraulic pressure according to a position of the spool in the axial direction;

a spring biasing the spool to one side in the axial direction; and a linear solenoid configured to drive the spool against a biasing force of the spring, wherein the spool valve has a feedback chamber configured to apply an axial force to the spool in response to the output hydraulic pressure, the valve housing has at least one input port, at least one output port, and at least one drain port, the at least one input port is configured to receive a hydraulic pressure, the at least one output port is configured to produce an output hydraulic pressure according to the position of the spool, the at least one drain port is configured to exhaust oil to an outside, the spool valve has at least one supply path to cause oil to flow from the at least one input port to the at least one output port, the spool valve has at least one exhaust path to cause oil to flow from the at least one output port to the at least one drain port, wherein the at least one supply path includes a plurality of supply paths, and/or the at least one exhaust path includes a plurality of exhaust paths, wherein
the plurality of supply path includes two supply paths,
the plurality of exhaust path includes two exhaust paths, wherein
the at least one input port includes one input port,
the at least one output port includes two output ports,
the at least one drain port includes two drain ports, wherein
the solenoid spool valve has a normally close configuration to produce an output hydraulic pressure, which becomes minimum when electricity supply to the linear solenoid stops, or a normally open configuration to produce the output hydraulic pressure, which becomes maximum when electricity supply to the linear solenoid stops,
the two output ports includes a first output port and a second output port,
the two drain ports includes a first drain port and a second drain port,
the two supply paths includes a first supply path and a second supply path,
the two exhaust paths includes a first exhaust path and a second exhaust path,
the spool includes a first input land, a second input land, a first drain land, and a second drain land,
the first input land is configured to open and close the first supply path to control a communication of the first supply path,
the second input land is configured to open and close the second supply path to control a communication of the second supply path,
the first drain land is configured to open and close the first exhaust path to control a communication of the first exhaust path,
the second drain land is configured to open and close the second exhaust path to control a communication of the second exhaust path,
with respect to the movable direction of the spool relative to the valve housing, a first side is on a side of the linear solenoid, and a second side is on an opposite side of the first side,
the first drain port, the first output port, the input port, the second output port, and the second drain port are arranged from the first side to the second side in the valve housing, and
the first drain land, the first input land, the second input land, and the second drain land are arranged from the first side to the second side in the spool.

* * * * *